US008641332B2

(12) United States Patent
Hiraga et al.

(10) Patent No.: US 8,641,332 B2
(45) Date of Patent: Feb. 4, 2014

(54) PROCESS FOR MACHINING PRESSURE DETECTION HOLE AND APPARATUS FOR MACHINING PRESSURE DETECTION HOLE

(75) Inventors: Kaneyoshi Hiraga, Wako (JP); Jun Sawada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 720 days.

(21) Appl. No.: 12/942,306

(22) Filed: Nov. 9, 2010

(65) Prior Publication Data
US 2011/0110737 A1 May 12, 2011

(30) Foreign Application Priority Data
Nov. 10, 2009 (JP) ................................. 2009-257415

(51) Int. Cl.
B23B 35/00 (2006.01)
B23B 41/00 (2006.01)

(52) U.S. Cl.
USPC .................. 408/1 R; 408/3; 408/16; 408/75; 408/91

(58) Field of Classification Search
CPC ........ B23B 35/00; B23B 41/00; B23B 41/14; B23B 49/00
USPC ............. 408/1 R, 3, 16, 75, 2, 91, 87, 69, 70
See application file for complete search history.

(56) References Cited

U.S. PATENT DOCUMENTS

| 390,956 | A | * | 10/1888 | Estabrook | ........................ 408/43 |
| 2,742,801 | A | * | 4/1956 | Opocensky et al. | .............. 408/3 |
| 4,778,313 | A | * | 10/1988 | Lehmkuhl | ...................... 409/127 |
| 2005/0214083 | A1 | * | 9/2005 | Chen | ............................. 408/89 |

FOREIGN PATENT DOCUMENTS

| DE | 19942980 A1 | * | 3/2001 | ............. B23Q 17/00 |
| DE | 10237426 A1 | * | 2/2004 | ............. G01B 11/24 |
| JP | 2006-184215 | | 7/2006 | |

* cited by examiner

Primary Examiner — Daniel Howell
Assistant Examiner — Ryan Rufo
(74) Attorney, Agent, or Firm — Rankin, Hill & Clark LLP

(57) ABSTRACT

A pressure detection passage and a side edge of a pressure detection member are positioned for a tip of a stylus attached to a drilling device by holding the pressure detection member on a hand-operated stage and moving the pressure detection member in the X axis direction by a micrometer head of the hand-operated stage while checking an enlarged image picked up by a microscope and displayed on a monitor, and a personal computer stores positions of the side edge of the pressure detection member and the pressure detection passage which are measured by scales of the micrometer head. Subsequently, the stylus is exchanged for a drill and the drilling device is moved down by a micrometer head for moving up and down a slider, while moving in sequence in the X axis direction the hand-operated stage by operating the micrometer head of the hand-operated stage so as to reappear the position stored in the personal computer, thereby drilling in the pressure detection member pressure detection holes communicating with the respective pressure detection passages. Therefore, it is possible to improve the precision and ease of operation of drilling a pressure detection hole in a pressure detection member.

2 Claims, 11 Drawing Sheets

US 8,641,332 B2

PROCESS FOR MACHINING PRESSURE DETECTION HOLE AND APPARATUS FOR MACHINING PRESSURE DETECTION HOLE

CROSS-REFERENCE TO RELATED APPLICATION

The present application claims priority under 35 USC 119 to Japanese Patent Application No. 2009-257415 filed on Nov. 10, 2009 the entire contents of which are hereby incorporated by reference.

BACKGROUND OF THE INVENTION

1. Field of the Invention

The present invention relates to a process in which, in a pressure detection member formed from a band-shaped sheet having the width direction as an X axis direction, the longitudinal direction as a Y axis direction, and the thickness direction as a Z axis direction and having formed in the interior thereof a plurality of pressure detection passages spaced at predetermined intervals in the X axis direction and extending in parallel to the Y axis direction, a plurality of pressure detection holes that communicate respectively with the plurality of pressure detection passages from one surface side of the pressure detection member and that are spaced at predetermined intervals in the Y axis direction are machined by means of a drill moving in the Z axis direction, and to an apparatus for carrying out this process.

2. Description of the Related Art

An arrangement in which a pliable sheet-shaped pressure detection member having formed therein a plurality of pressure detection passages extending in parallel is affixed to a surface of a main wing of an airplane along a chord line, a pressure detection hole formed in each pressure detection passage is connected to a pressure measuring device via a pressure pipe, and a static pressure in each pressure detection hole is measured by the pressure measuring device to thus measure a pressure distribution on the surface of the main wing is known from Japanese Patent Application Laid-open No. 2006-184215, which is related to an application of the present assignee.

However, the plurality of pressure detection passages formed in the interior of a very thin pressure detection member having a thickness of on the order of 1 mm have a diameter of on the order of only 0.6 mm, and the pressure detection holes communicating respectively with the pressure detection passages from one surface of the pressure detection member have a small diameter of on the order of 0.2 mm. Conventionally, an operator has drilled this very small pressure detection hole by eye, and there are therefore the problems that operating error easily occurs such that the position of the pressure detection hole is displaced and it does not communicate properly with a target pressure detection passage or communicates with another pressure detection passage, and the operation requires a long time and much effort.

SUMMARY OF THE INVENTION

The present invention has been accomplished under the above-mentioned circumstances, and it is an object thereof to improve the precision and ease of operation of drilling a pressure detection hole in a pressure detection member.

In order to achieve the object, according to a first feature of the present invention, there is provided a process for machining a pressure detection hole in which, in a pressure detection member formed from a band-shaped sheet having the width direction as an X axis direction, the longitudinal direction as a Y axis direction, and the thickness direction as a Z axis direction and having formed in the interior thereof a plurality of pressure detection passages spaced at predetermined intervals in the X axis direction and extending in parallel to each other in the Y axis direction, a plurality of pressure detection holes that communicate respectively with the plurality of pressure detection passages from one surface side of the pressure detection member and that are spaced at predetermined intervals in the Y axis direction are machined by means of a drill moving in the Z axis direction, the process comprising: a first step of measuring and storing positions in the X axis direction of one side edge of the pressure detection member and the plurality of pressure detection passages by moving the pressure detection member in the X axis direction while checking an enlarged image of the pressure detection member and a tip of a stylus, which can be exchanged for the drill, so as to make an axis of the stylus coincide in sequence with said one side edge of the pressure detection member and the plurality of pressure detection passages; a second step of giving the pressure detection member a marking indicating a position in the Y axis direction at which the pressure detection hole is to be machined; a third step of positioning the pressure detection member by moving it in the Y axis direction based on the marking so that the position in the Y axis direction of the pressure detection hole that is to be machined coincides with the position of the axis of the drill that the stylus has been exchanged for; a fourth step of positioning the pressure detection member by moving it in the X axis direction so that the position in the X axis direction of the pressure detection hole that is to be machined coincides with the position of the axis of the drill; and a fifth step of machining the pressure detection hole by moving the drill in the Z axis direction; the plurality of pressure detection holes being machined by repeating the third step to the fifth step.

In accordance with the first feature, in the first step, while checking an enlarged image of the pressure detection member and the tip of the stylus that can be exchanged for the drill, the pressure detection member is moved in the X axis direction so as to make the axis of the stylus coincide with one side edge of the pressure detection member and the plurality of pressure detection passages in sequence, and the positions in the X axis direction of said one side edge of the pressure detection member and the plurality of pressure detection passages are measured and stored, in the second step the pressure detection member is given a marking indicating the position in the Y axis direction at which a pressure detection hole is to be machined, in the third step the pressure detection member is moved and positioned in the Y axis direction based on the marking so that the position in the Y axis direction of the pressure detection hole that is to be machined coincides with the position of the axis of the drill that the stylus has been exchanged for, in the fourth step the pressure detection member is moved and positioned in the X axis direction so that the position in the X axis direction of the pressure detection hole that is to be machined coincides with the position of the axis of the drill, and in the fifth step the pressure detection hole is machined by moving the drill in the Z axis direction; it is therefore possible to properly position the drill relative to the plurality of pressure detection passages of the pressure detection member without requiring difficult operations that demand skill, and drill the pressure detection hole with good precision. Moreover, since the operation of measuring the positions in the X axis direction of said one side edge of the pressure detection member and the plurality of pressure detection passages can be carried out while checking an enlarged image of the pressure detection member and the tip of the stylus, the ease of operation is greatly improved.

According to a second feature of the present invention, there is provided a pressure detection hole machining apparatus for carrying out the process for machining a pressure detection hole according to the first feature, the apparatus comprising: pressure detection member positioning means that is capable of detachably holding the pressure detection member and of moving in the X axis direction; a drilling device that, relative to the pressure detection member positioning means, cannot move in the Y axis direction but can move in the Z axis direction, and that supports the stylus or the drill; a microscope that picks up an enlarged image of the pressure detection member and the tip of the stylus or the drill and displays it on a monitor; and storage means that stores positions in the X axis direction of said one side edge of the pressure detection member and the plurality of pressure detection passages read off using the image displayed on the monitor.

In accordance with the second feature, since the pressure detection member positioning means that is capable of detachably holding the pressure detection member and moving in the X axis direction is provided, the first step and the fourth step can be carried out with good precision. Moreover, since the drilling device that, relative to the pressure detection member positioning means, cannot move in the Y axis direction but can move in the Z axis direction, and that supports the stylus or the drill is provided, the fifth step can be carried out easily. Furthermore, since the microscope that picks up an enlarged image of the pressure detection member and the tip of the stylus or the drill and displays it on a monitor is provided, the first step can be carried out easily. Moreover, since the storage means that stores positions in the X axis direction of said one side edge of the pressure detection member and the plurality of pressure detection passages read off using the image displayed on the monitor is provided, the fourth step can be carried out reliably.

Here, a hand-operated stage 24 of an embodiment corresponds to the pressure detection member positioning means of the present invention; and a personal computer 41 of the embodiment corresponds to the storage means of the present invention.

The above description, other objects, characteristics and advantages of the present invention will be clear from detailed descriptions which will be provided for the preferred embodiment referring to the attached drawings.

DESCRIPTION OF THE PREFERRED EMBODIMENT

DESCRIPTION OF THE PREFERRED EMBODIMENT

An embodiment of the present invention will be described below based on FIG. 1 to FIG. 11.

First, based on FIG. 1 to FIG. 4, the structure of a pressure detection member 11 of the present embodiment is explained.

Figure 1:
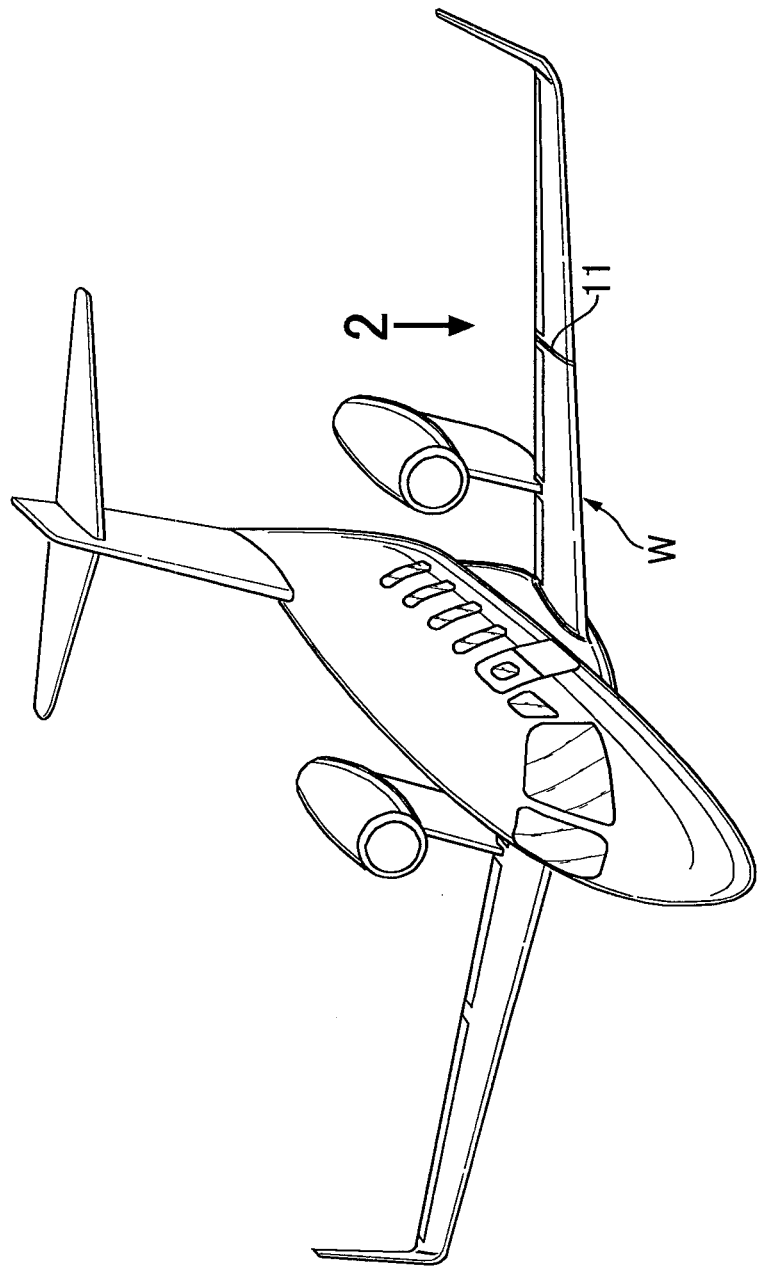
FIG. 1 is a perspective view of an airplane with a pressure detection member being mounted on a surface of a main wing.
Figure 2:
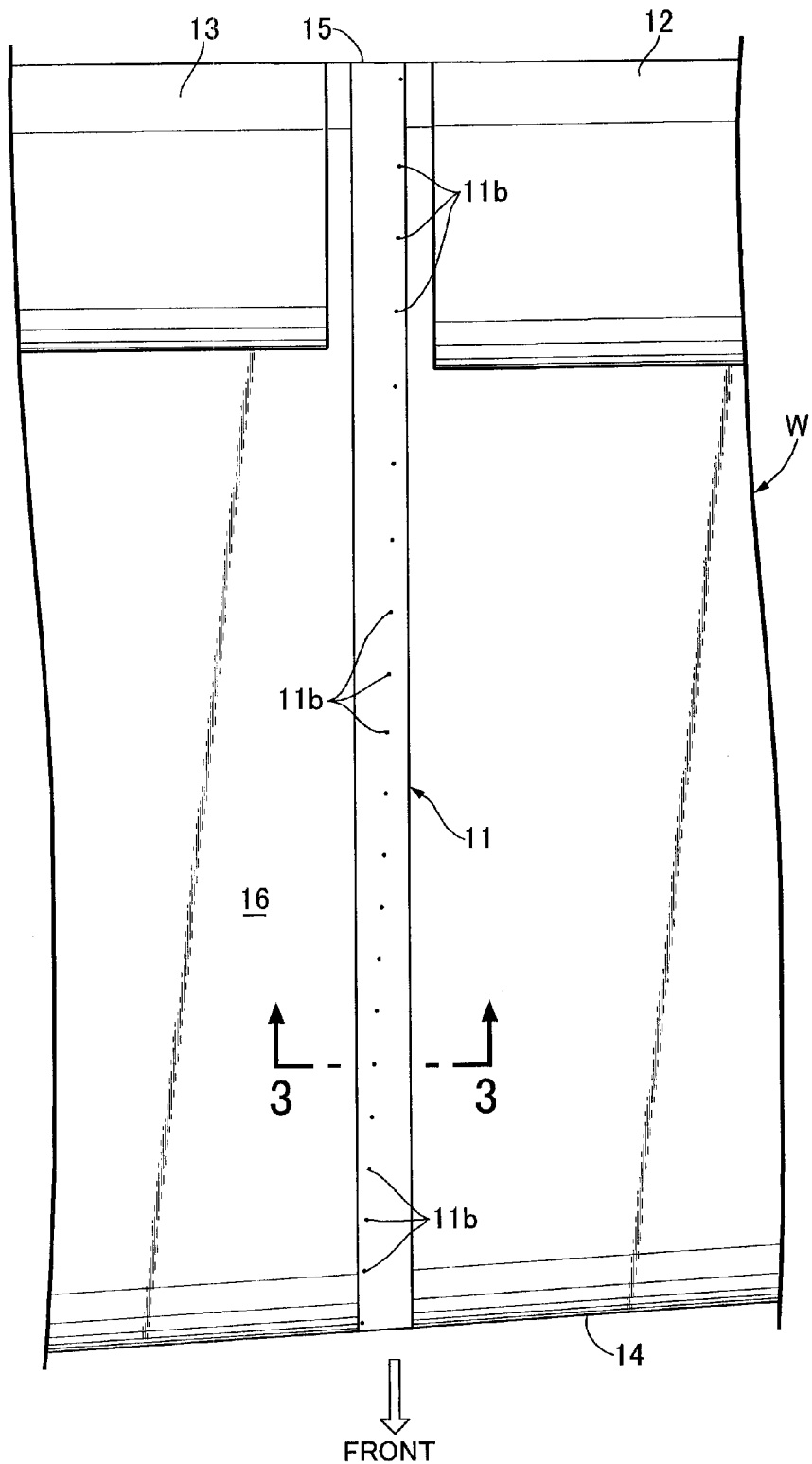
FIG. 2 is an enlarged view seen from a direction of an arrow 2 in FIG. 1.

As shown in FIG. 1 and FIG. 2, in order to measure a pressure distribution in a chord direction on an upper face of an airplane main wing W, a pressure detection member 11, which is formed from a long narrow band-shaped sheet, is detachably mounted by, for example, an adhesive. The pressure detection member 11 extends along a chord line of the main wing W from a front edge 14 to a rear edge 15 at a position that avoids an aileron 12 and a flap 13.

Figure 4:
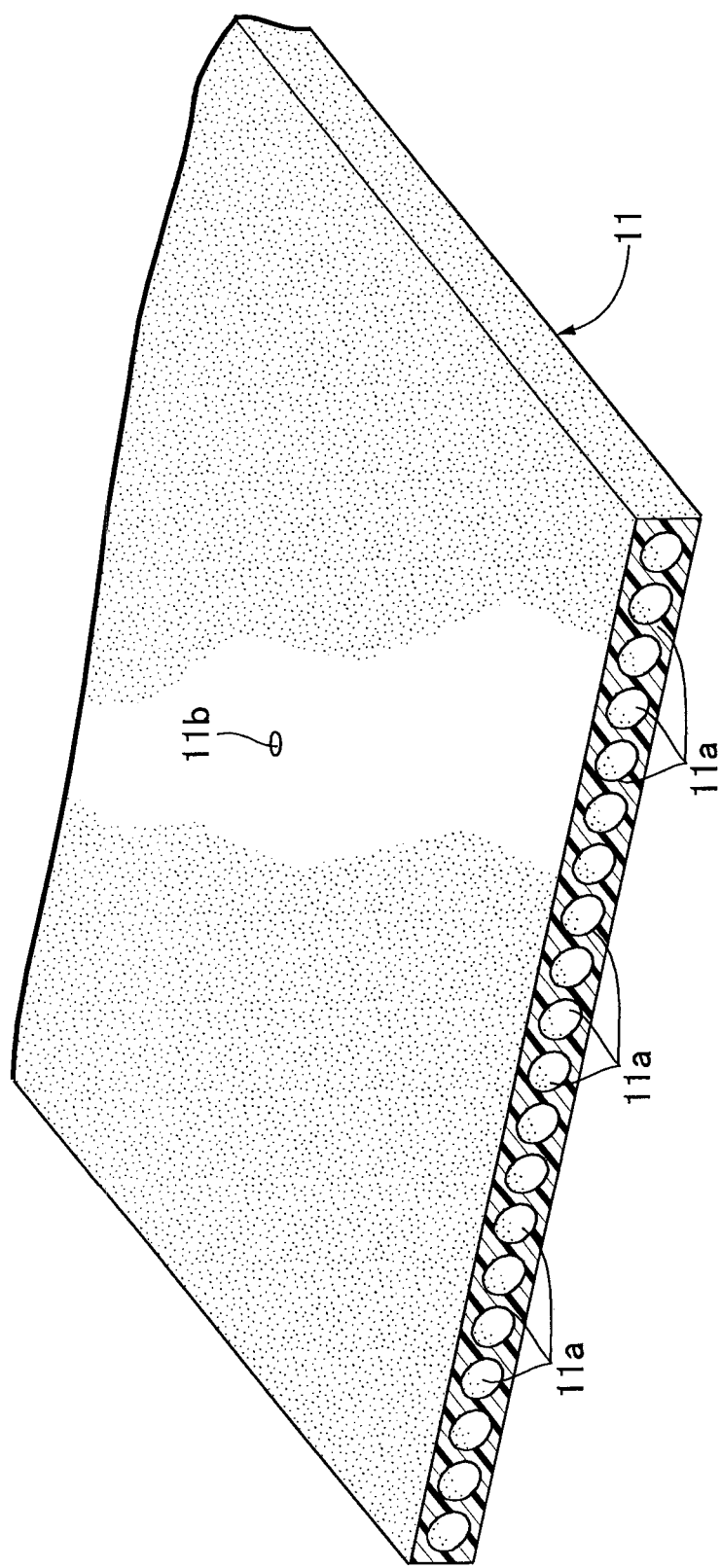
FIG. 4 is a perspective view of the pressure detection member.
Figure 5:
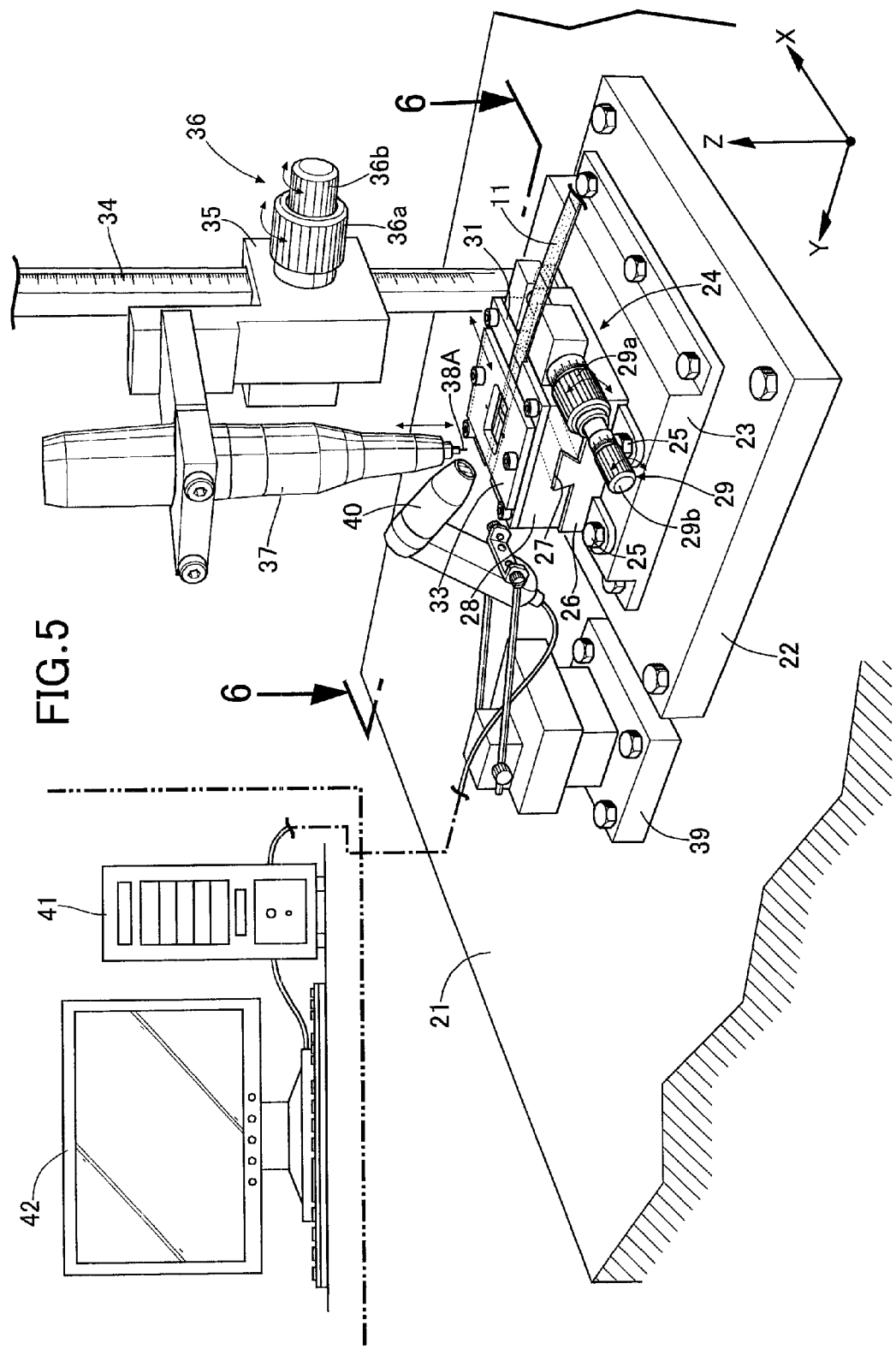
FIG. 5 is a perspective view of an apparatus for machining the pressure detection member.

As shown in FIG. 4, the pressure detection member 11 is a thin member, having a thickness of on the order of 1 mm, that is extrusion molded from a synthetic resin, and has in its interior a plurality of pressure detection passages 11a extending in parallel and extending through in the longitudinal direction. Since openings at opposite ends of the pressure detection passages 11a are hermetically closed by thermal bonding, etc. when used, and due to opposite front and rear edges of the pressure detection member 11 being flattened so as to be thin at that time, the effect on air flow can be minimized.

As shown in FIG. 2 and FIG. 4, one pressure detection hole 11b is drilled in each of the pressure detection passages 11a of the pressure detection member 11, the pressure detection holes 11b being spaced at predetermined intervals in the fore-and-aft direction. The interval between the pressure detection holes 11b is freely determined, but it is desirable that in a portion closer to the front edge 14 where the percentage change in pressure distribution in the chord direction of the main wing W is large the interval is set small, and in a portion closer to the rear edge 15 where the percentage change in pressure distribution is small the interval is set large. Since only one pressure detection hole 11b is provided in one pressure detection passage 11a, a line joining adjacent pressure detection holes 11b is slightly inclined relative to the chord direction of the main wing W, but since the overall width of the pressure detection member 11 is far smaller than the chord length of the main wing W, the effect of the inclination can be ignored. If it is necessary to make the line joining the pressure detection holes 11b accurately coincide with the chord direction of the main wing W, the pressure detection member 11 may be mounted so that the longitudinal direction of the pressure detection member 11 is inclined relative to the chord direction of the main wing W.

Figure 3:
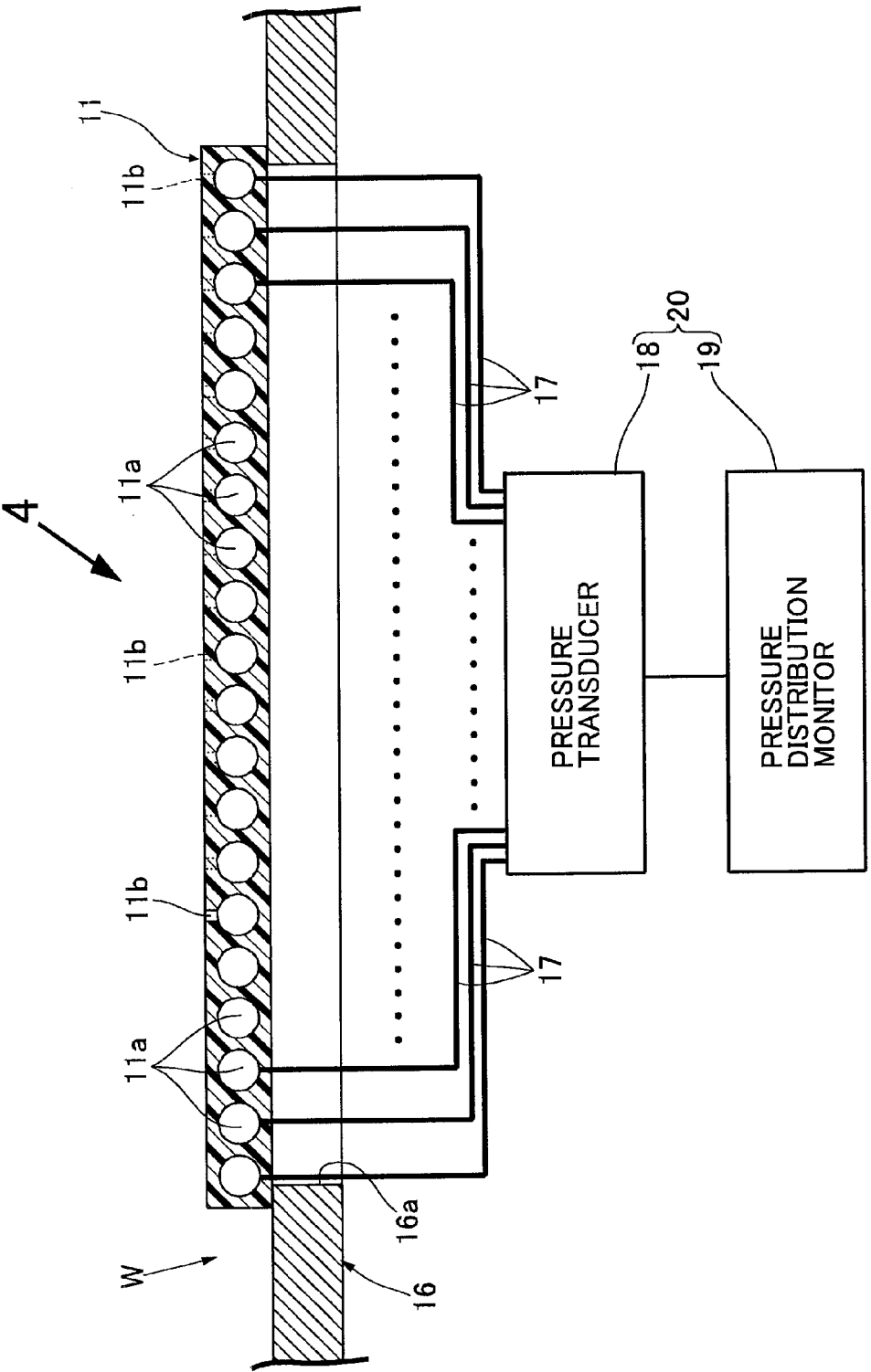
FIG. 3 is an enlarged sectional view taken along a line 3-3 in FIG. 2.

As shown in FIG. 3, the pressure detection member 11 is affixed so as to cover an opening 16a formed in a skin panel 16 of the main wing W, and pressure pipes 17 formed from flexible synthetic resin pipes are connected to the pressure detection passages 11a of the pressure detection member 11 at positions facing the opening 16a. These pressure pipes 17 are bundled, extend to the interior of a fuselage through the interior of the main wing W, and are connected therein to a pressure measuring device 20 formed from a pressure transducer 18 and a pressure distribution monitor 19. If an opening for maintenance, etc. pre-provided in the skin panel 16 is utilized as the opening 16a of the skin panel 16 for allowing the pressure pipes 17 to pass through, it becomes unnecessary to form a special opening for measuring pressure distribution in the skin panel 16, and the main wing W is not damaged.

When there is no appropriate opening 16a in the skin panel 16 of the main wing W, if the pressure pipes 17 are taken out in the rear edge 15 of the main wing W from the pressure detection passages 11a of the pressure detection member 11, the effect of the pressure pipes 17 on air flow on the surface of the main wing W can be minimized.

When air flows along the surface of the main wing W of the airplane when in flight, a predetermined pressure distribution is formed along its chord line. Part of the air flows along the surface of the pressure detection member 11 affixed to the skin panel 16 of the main wing W, and the pressure of the pressure detection holes 11b communicating with the respective pressure detection passages 11a changes according to the flow rate of air flowing there. The pressure of the pressure detection holes 11b is transmitted to the pressure measuring device 20 via the corresponding pressure detection passages 11a and pressure pipes 17 in the interior of the main wing W, converted into a numerical value in the pressure transducer 18, and displayed on the pressure distribution monitor 19.

Next, an apparatus for drilling the pressure detection holes 11b in the pressure detection member 11 is explained by reference to FIG. 5 to FIG. 8. In the explanation below, the width direction of the pressure detection member 11, which is fixed to a hand-operated stage 24, is defined as an X axis direction, the longitudinal direction is defined as a Y axis direction, and the thickness direction is defined as a Z axis direction.

As shown in FIG. 5 to FIG. 8, the hand-operated stage 24 is fixed to an upper face of a lower base 22 and upper base 23 fixed to an upper face of a horizontally disposed table 21. The hand-operated stage 24 includes a rectangular plate-shaped base plate 26 fixed by bolts 25 to the upper face of the upper base 23, a rectangular plate-shaped slide plate 28 supported on an upper face of the base plate 26 in a dovetail groove engagement 27 so that it can move in the X axis direction, and a micrometer head 29 for moving the slide plate 28 relative to the base plate 26. The micrometer head 29 includes a coarse dial 29a and a fine dial 29b; rotating the coarse dial 29a allows the slide plate 28 to move in the X axis direction in accordance with its rotational direction by, for example, 0.01 mm per division, and rotating the fine dial 29b allows the slide plate 28 to move in the X axis direction in accordance with its rotational direction by, for example, 0.0005 mm per division.

A guide plate 31 fixed by bolts 30 to an upper face of the slide plate 28 includes a guide groove 31a extending in the Y axis direction, which is perpendicular to the X axis direction. A groove width W (see FIG. 9) of the guide groove 31a coincides with the width of the pressure detection member 11, and a depth D (see FIG. 9) of the guide groove 31a is set so as to be slightly smaller than the thickness of the pressure detection member 11. A clamp plate 33 detachably fixed to an upper face of the guide plate 31 by bolts 32 and 32 includes a rectangular window hole 33a in its central part, and the guide groove 31a is exposed so that it can be viewed through this window hole 33a. Fitting the pressure detection member 11 in the guide groove 31a of the guide plate 31 and fixing the clamp plate 33 by the bolts 32 and 32 clamps and fixes the pressure detection member 11 between an upper face of the guide groove 31a and a lower face of the clamp plate 33.

A slider 35 is slidably supported on a guide post 34 provided so as to stand upright on the upper base 23, and this slider 35 is moved up and down in the Z axis direction along the guide post 34 by means of a micrometer head 36. The micrometer head 36 includes a coarse dial 36a and a fine dial 36b; rotating the coarse dial 36a moves the slider 35 up and down in accordance with its rotational direction by, for example, 0.1 mm per division, and rotating the fine dial 29b moves the slider 35 up and down in accordance with its rotational direction by, for example, 0.01 mm per division. A drilling device 37 formed from an electric drill is supported on the slider 35, and a stylus 38A (or a drill 38B shown in FIG. 11) is supported by a chuck at the lower end of the drilling device 37 so as to face downward in the vertical direction (Z axis direction). The position in the Y axis direction of the stylus 38A of the drilling device 37 is set in a central part of the window hole 33a of the clamp plate 33, and reference marks 33b and 33b are provided on the edges of the window hole 33a so as to correspond to the position in the Y axis direction of the stylus 38A.

A microscope 40 is supported on the upper face of the table 21 via a base 39. The microscope 40 is disposed so as to pick up an image of the central part of the window hole 33a of the clamp plate 33 obliquely downward in the Y axis direction, and the image is displayed on a monitor 42 connected to a personal computer 41.

Next, a step of drilling the pressure detection holes 11b in the pressure detection member 11 is explained by reference to FIG. 6 to FIG. 11.

Figure 6:
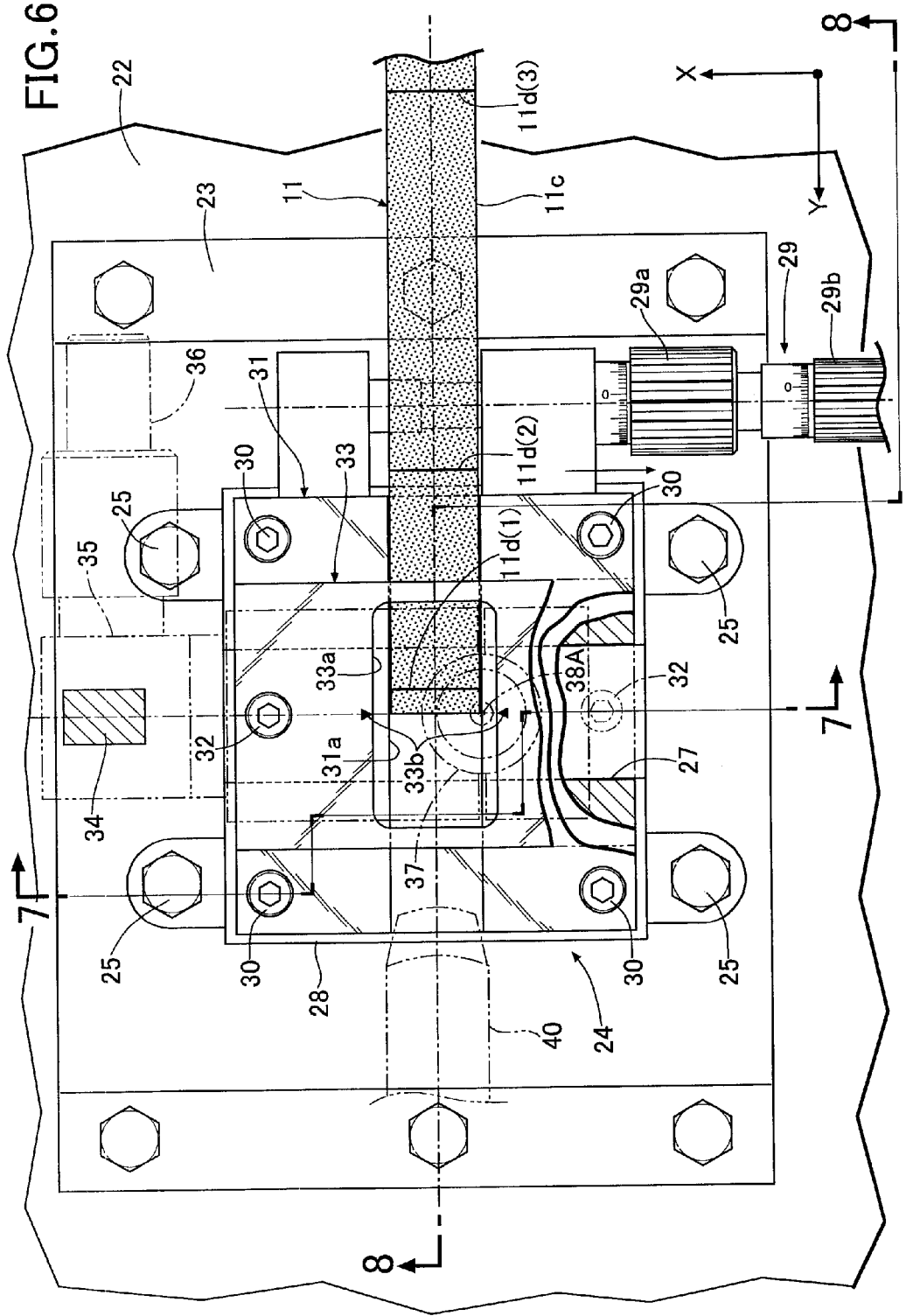
FIG. 6 is a view taken along arrow directions of a line 6-6 in FIG. 5.
Figure 7:
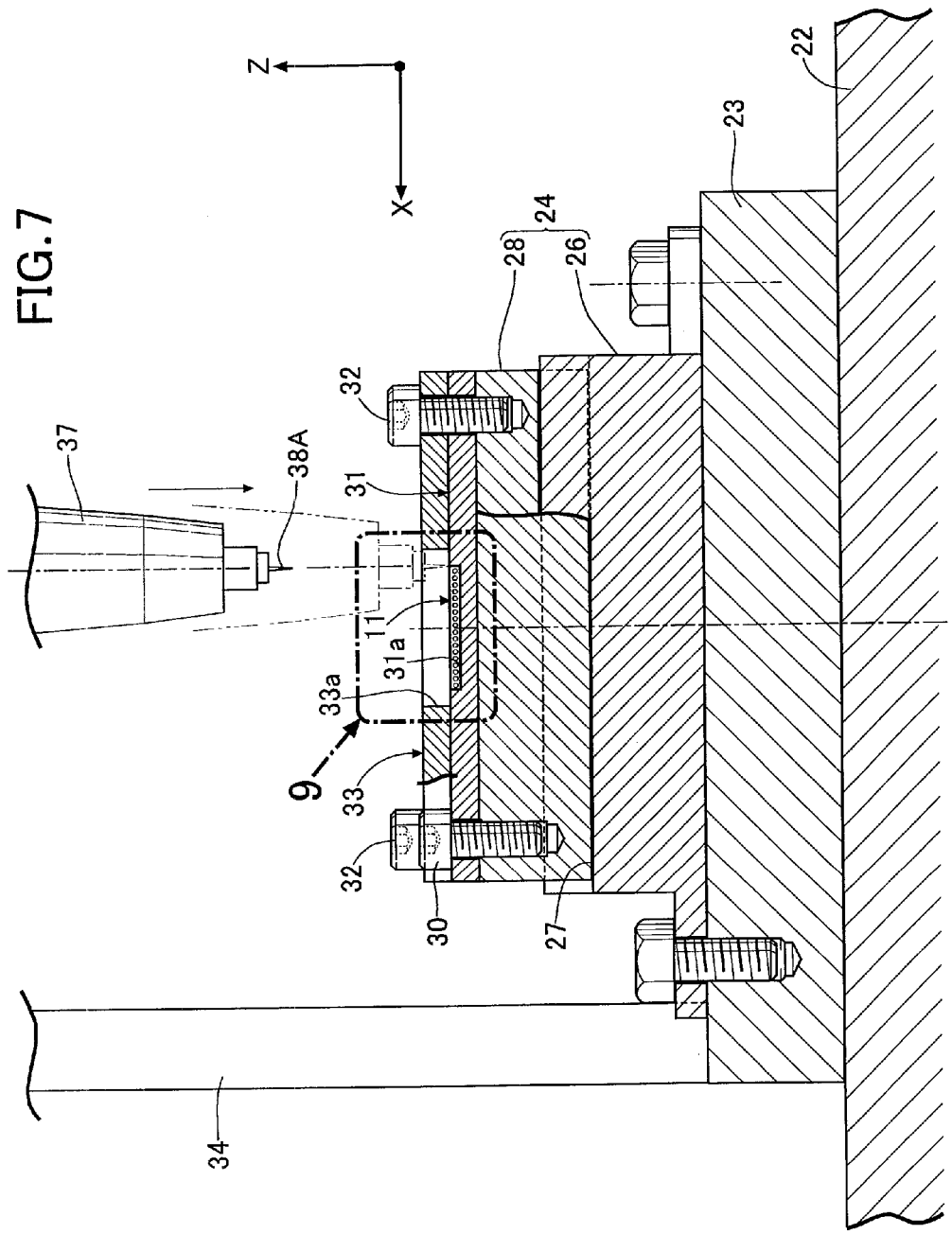
FIG. 7 is a sectional view taken along a line 7-7 in FIG. 6.
Figure 8:
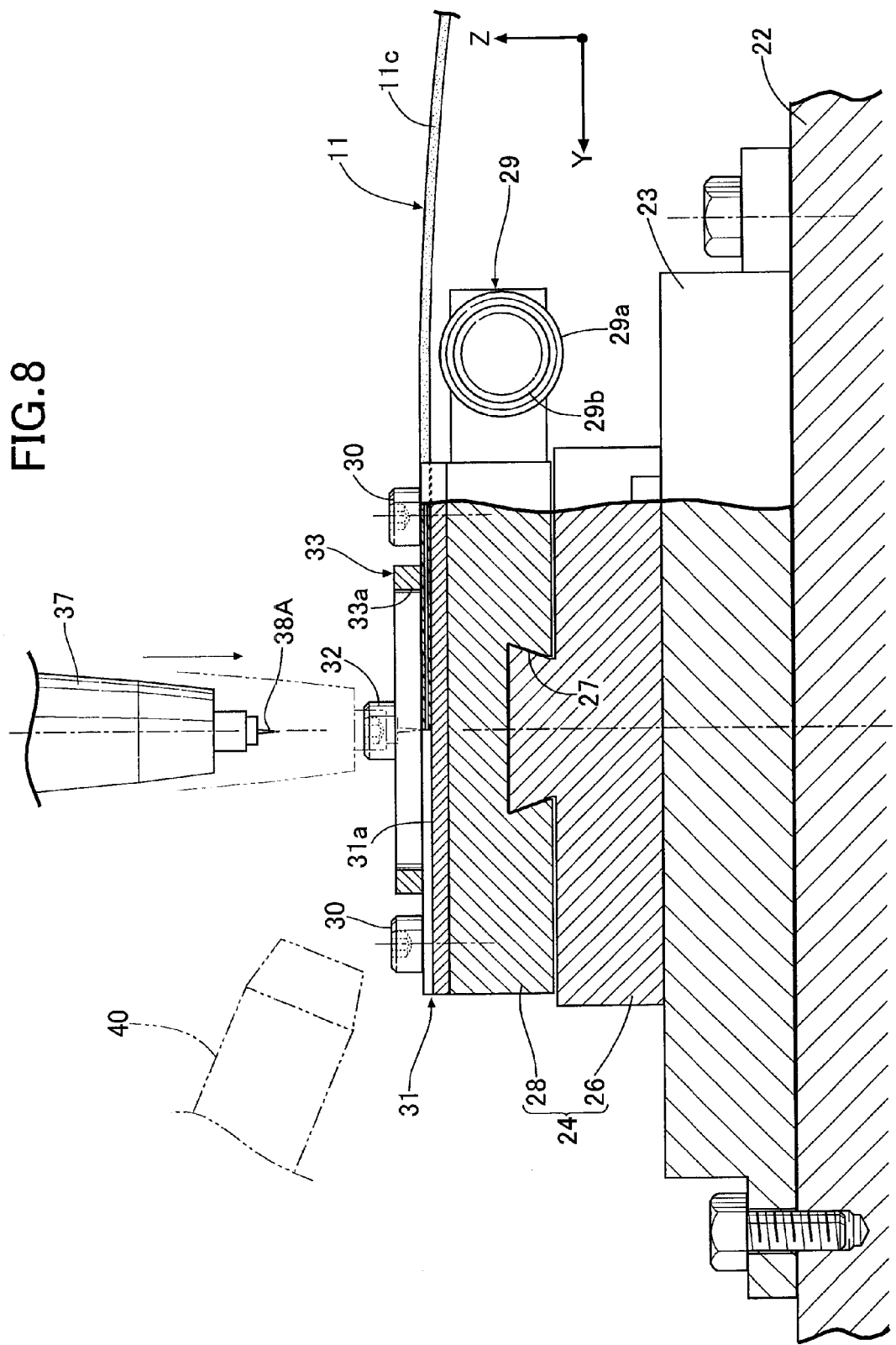
FIG. 8 is a sectional view taken along a line 8-8 in FIG. 6.

First, as shown in FIG. 6 to FIG. 8, the pressure detection member 11 is fitted in the guide groove 31a of the guide plate 31, and the clamp plate 33 is secured from above by the bolts 32 and 32 to thus fix the pressure detection member 11. Here, positioning is carried out so that the tip of the pressure detection member 11 coincides with the reference marks 33b and 33b of the window hole 33a of the clamp plate 33.

Figure 9:
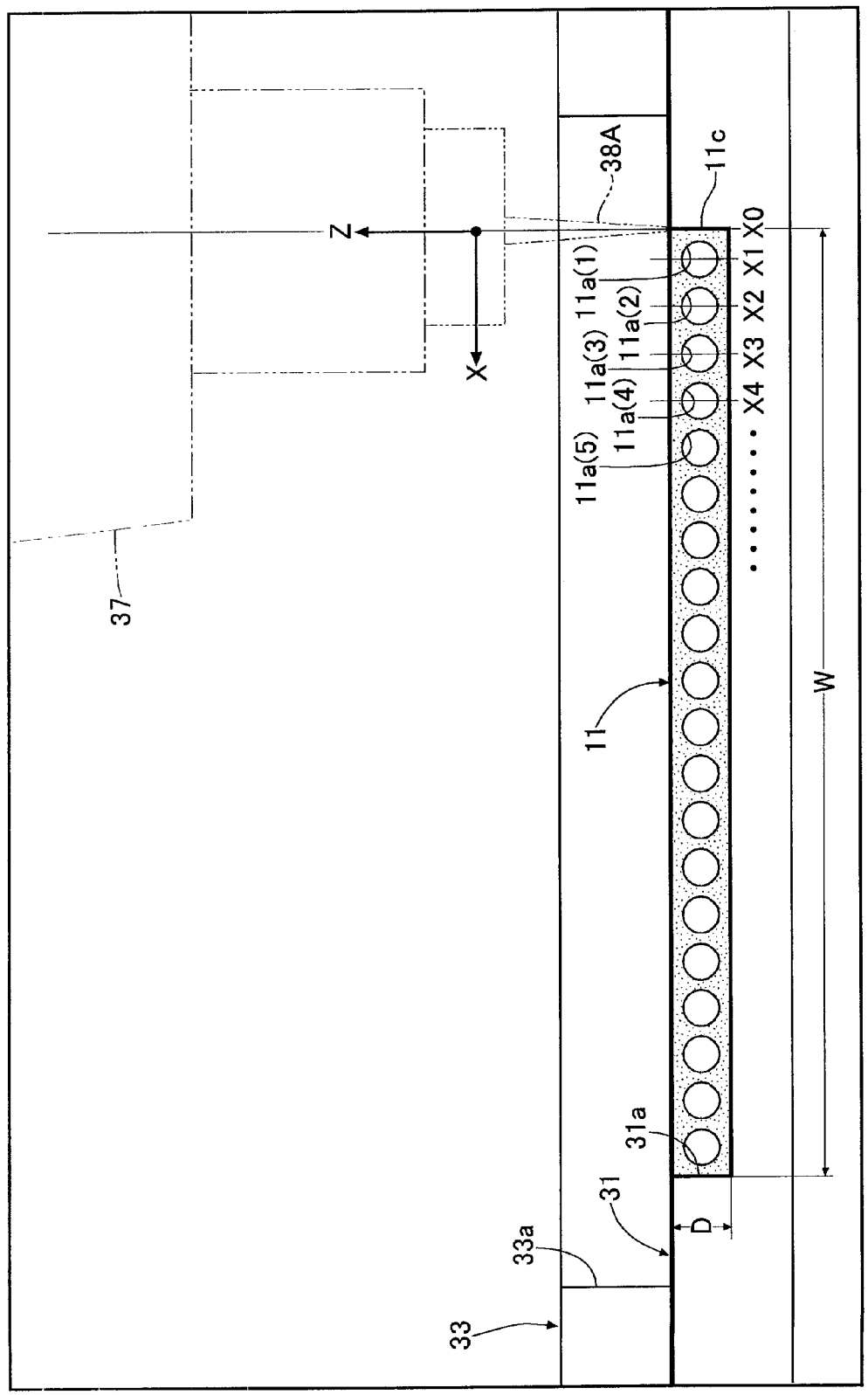
FIG. 9 is a view showing a screen of a monitor.
Figure 10:
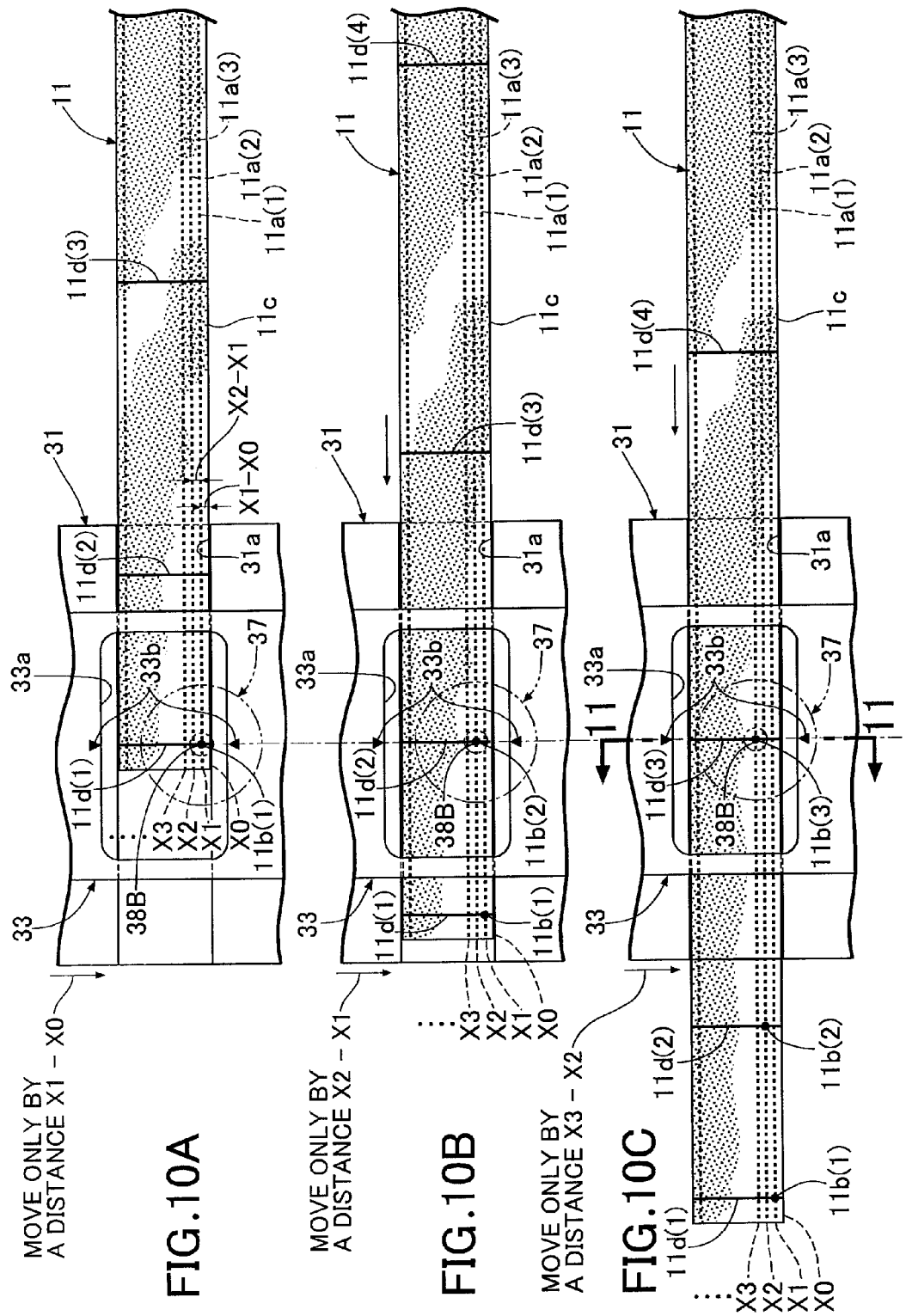
FIG. 10A to 10C are views explaining a process for machining pressure detection holes.

Subsequently, as shown in FIG. 9, in a state in which the stylus 38A is mounted on the drilling device 37, while checking on the monitor 42 an enlarged image of an end face of the pressure detection member 11 picked up by the microscope 40, the micrometer head 36 is rotated so as to move the slider 35 along the guide post 34, thus making the height of the tip of the stylus 38A substantially coincide with the height of the upper face of the pressure detection member 11. Here, the height of the tip of the stylus 38A is roughly adjusted by operating the coarse dial 36a of the micrometer head 36, and subsequently the height of the tip of the stylus 38A is precisely adjusted by operating the fine dial 36b, thus improving the operating efficiency.

Subsequently, operating the micrometer head 29 of the hand-operated stage 24 so as to move the pressure detection member 11 together with the slide plate 28 in the X axis direction makes the position in the X axis direction of the tip of the stylus 38A coincide with the position of one side edge 11c of the pressure detection member 11, and a scale of the micrometer head 29 at that time, that is, an X coordinate (X0) of the side edge 11c of the pressure detection member 11, is read off and stored in the personal computer 41. Subsequently, operating the micrometer head 29 so as to move the pressure detection member 11 together with the slide plate 28 in the X axis direction makes the position in the X axis direction of the tip of the stylus 38A coincide with the position of a first pressure detection passage 11a (1), which is the closest to the side edge 11c, and the scale of the micrometer head 29 at that time, that is, an X coordinate (X1) of the first pressure detection passage 11a (1) of the pressure detection member 11, is read off and stored in the personal computer 41.

By repeating the above-mentioned operation, X coordinates X2, X3, X4, X5, . . . of second, third fourth, fifth, . . . pressure detection passages 11a (2), 11a (3), 11a (4), 11a (5), . . . from the side edge 11c of the pressure detection member 11 are read off and stored in the personal computer 41. While carrying out this operation, the coarse dial 29a of the micrometer head 29 is operated so as to roughly adjust the position in the X axis direction of the tip of the stylus 38A, and subsequently the fine dial 29b is operated so as to precisely adjust the position in the X axis direction of the tip of the stylus 38A, thus improving the operating efficiency.

Subsequently, the pressure detection member 11 is temporarily removed from the hand-operated stage 24, and in order to display the position on the pressure detection member 11 at which the pressure detection holes 11b are to be machined, transverse markings 11d (see FIGS. 10A to 10C) are drawn as marks on the pressure detection member 11. Since, if the positions of the pressure detection holes 11b along the longitudinal direction (Y axis direction) of the pressure detection member 11 are displaced to some degree in the Y axis direction, there are no defects such as the pressure detection holes 11b not communicating with the pressure detection passages 11a, there is no necessity for particularly high precision in the Y axis direction for the markings 11d.

Subsequently, the stylus 38A of the drilling device 37 is removed, and instead the drill 38B (see FIG. 11) is fitted. The pressure detection member 11 is fixed to the hand-operated stage 24 so that a first marking 11d (1), which is the closest to an end part of the pressure detection member 11, coincides with the reference marks 33b and 33b of the window hole 33a of the clamp plate 33, and the micrometer head 29 of the hand-operated stage 24 is then operated while checking an enlarged image picked up by the microscope 40 to thus make the position in the X axis direction of the tip of the drill 38B coincide with the side edge 11c of the pressure detection member 11.

Subsequently, as shown in FIG. 10A, operating the micrometer head 29 of the hand-operated stage 24 so as to move the position of the drill 38B only by a distance X1−X0 in the X axis direction positions the drill 38B above the first pressure detection passage 11a (1). Here, the value for the distance X1−X0 is calculated from the values for X0 and X1 stored in advance in the personal computer 41.

Figure 11:
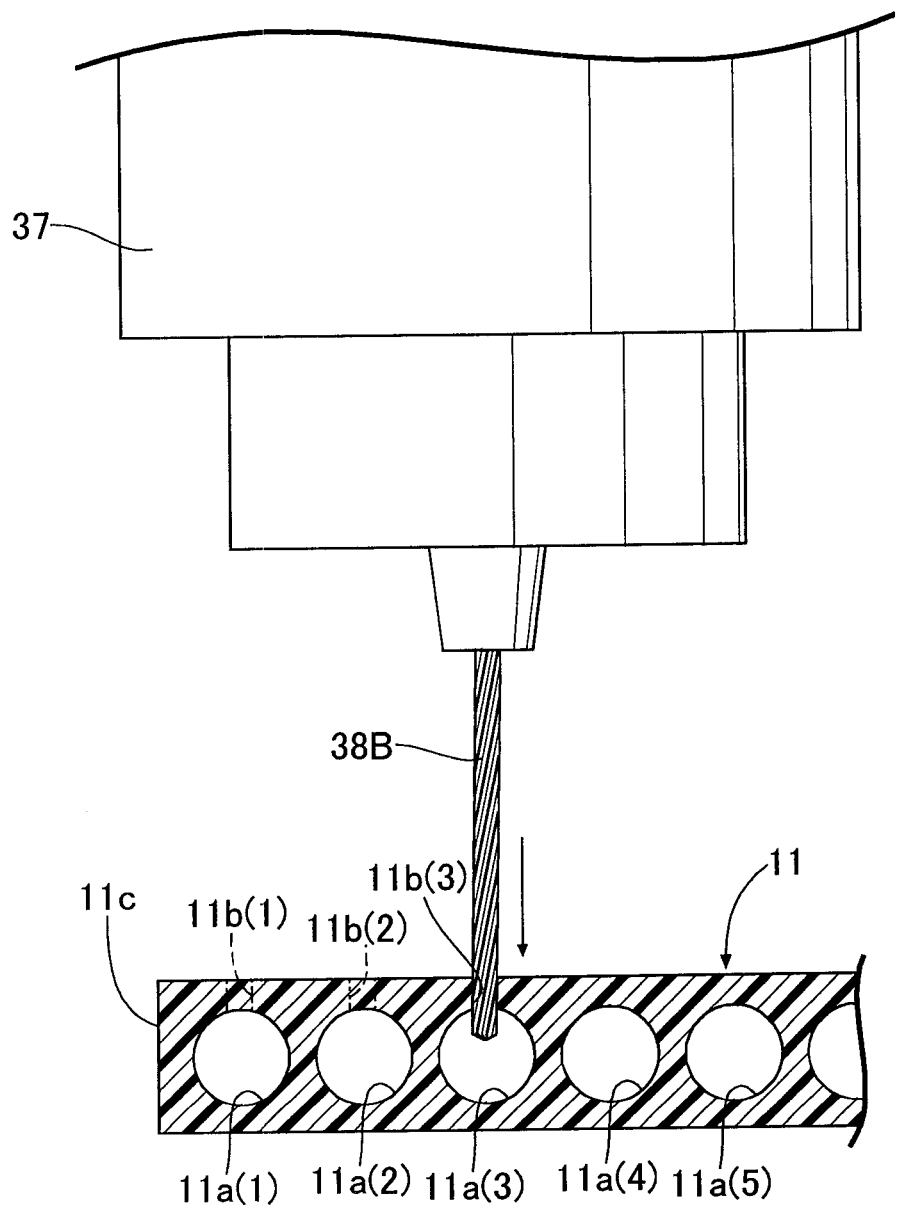
FIG. 11 is an enlarged view taken along a line 11-11 in FIG. 10.

In this way, when the drill 38B is positioned above the first pressure detection passage 11a (1), as shown in FIG. 11 operating the micrometer head 36 so as to make the drilling device 37 move down along the guide post 34 enables a first pressure detection hole 11b (1) communicating with the first pressure detection passage 11a (1) to be machined in the pressure detection member 11.

Subsequently, as shown in FIG. 10B the clamp plate 33 is loosened and the pressure detection member 11 is moved in the Y axis direction to a position at which a second marking 11d (2) coincides with the reference lines 33b and 33b of the window hole 33a of the clamp plate 33 and the pressure detection member 11 is fixed. Operating the micrometer head 29 of the hand-operated stage 24 so as to move the position of the drill 38B only by a distance X2−X1 in the X axis direction positions the drill 38B above the second pressure detection passage 11a (2), and then operating the micrometer head 36 so as to make the drilling device 37 move down along the guide post 34 enables a second pressure detection hole 11b (2) communicating with the second pressure detection passage 11a (2) to be machined in the pressure detection member 11.

Subsequently, as shown in FIG. 10C, the clamp plate 33 is loosened and the pressure detection member 11 is moved in the Y axis direction to a position at which a third marking 11d (3) coincides with the reference lines 33b and 33b of the window hole 33a of the clamp plate 33 and the pressure detection member 11 is fixed. Operating the micrometer head 29 of the hand-operated stage 24 so as to move the position of the drill 38B only by a distance X3−X2 in the X axis direction positions the drill 38B above the third pressure detection passage 11a (3), and then operating the micrometer head 36 so as to make the drilling device 37 move down along the guide post 34 enables a third pressure detection hole 11b (3) communicating with the third pressure detection passage 11a (3) to be machined in the pressure detection member 11.

Following this, repeating the above enables all of the pressure detection holes 11b to be machined in the pressure detection member 11.

As hereinbefore described, in accordance with the present embodiment, since the position of the side edge 11c of the pressure detection member 11 and the positions of the plurality of pressure detection passages 11a are measured and stored in advance using the hand-operated stage 24 and the pressure detection holes 11b are drilled by positioning the drill 38B at the stored positions using the hand-operated stage 24, it becomes possible to improve the machining precision of the pressure detection holes 11b without carrying out difficult operations requiring skill, and it becomes possible to avoid defective machining in which the pressure detection holes 11b do not communicate with the corresponding pressure detection passages 11a or defective machining in which the pressure detection holes 11b communicate with unintended pressure detection passages 11a.

Furthermore, when measuring the position of the side edge 11c of the pressure detection member 11 or the positions of the plurality of pressure detection passages 11a, since the position of the tip of the stylus 38A and the positions of the pressure detection passages 11a of the pressure detection member 11 are displayed on the monitor 42 as an enlarged image picked up by the microscope 40, the measurement precision and working efficiency can be greatly improved.

Moreover, in a measurement step and a hole opening step, since the position in the X axis direction of the pressure detection member 11 is managed by means of the hand-operated stage 24 equipped with the micrometer head 29, the working precision can easily be guaranteed.

An embodiment of the present invention is explained above, but the present invention may be modified in various ways as long as the modifications do not depart from the gist thereof.

For example, in the embodiment the stylus 38A exclusively used therefor is employed, but instead of the stylus 38A the drill 38B may be utilized. By so doing, it becomes unnecessary to change the stylus 38A for the drill 38B, thus improving the operating efficiency.

Furthermore, in the embodiment, after the position of the side edge 11c of the pressure detection member 11 and the positions of the pressure detection passages 11a are measured, the markings 11d are provided on the pressure detection member 11, but the markings 11d may be provided before said measurement.

Moreover, the hand-operated stage 24 of the embodiment can adjust the position of the pressure detection member 11 only in the X axis direction, but the convenience is improved by an arrangement in which the position of the pressure detection member 11 is adjustable both in the X axis direction and the Y axis direction.

Furthermore, in the embodiment, the operation of adjusting the position in the Y axis direction of the pressure detection member 11 relative to the hand-operated stage 24 is carried out by loosening the clamp plate 33, but making it possible to feed the pressure detection member 11 in the Y axis direction relative to the hand-operated stage 24 by means of a roller, etc. rotated by operation of a knob further improves the operability.

What is claimed is:

1. A process for machining a pressure detection hole in which, in a pressure detection member formed from a band-shaped sheet having the width direction as an X axis direction, the longitudinal direction as a Y axis direction, and the thickness direction as a Z axis direction and having formed in the interior thereof a plurality of pressure detection passages spaced at predetermined intervals in the X axis direction and extending in parallel to each other in the Y axis direction, a plurality of pressure detection holes that communicate respectively with the plurality of pressure detection passages from one surface side of the pressure detection member and that are spaced at predetermined intervals in the Y axis direction are machined by means of a drill moving in the Z axis direction, the process comprising:

a first step of measuring and storing positions in the X axis direction of one side edge of the pressure detection member and the plurality of pressure detection passages by moving the pressure detection member in the X axis direction while checking an enlarged image of the pressure detection member and a tip of a stylus, which can be exchanged for the drill, so as to make an axis of the stylus coincide in sequence with said one side edge of the pressure detection member and the plurality of pressure detection passages;

a second step of giving the pressure detection member a marking indicating a position in the Y axis direction at which the pressure detection hole is to be machined;

a third step of positioning the pressure detection member by moving it in the Y axis direction based on the marking so that the position in the Y axis direction of the pressure detection hole that is to be machined coincides with the position of the axis of the drill that the stylus has been exchanged for;

a fourth step of positioning the pressure detection member by moving it in the X axis direction so that the position in the X axis direction of the pressure detection hole that is to be machined coincides with the position of the axis of the drill; and a fifth step of machining the pressure detection hole by moving the drill in the Z axis direction;

the plurality of pressure detection holes being machined by repeating the third step to the fifth step.

2. A pressure detection hole machining apparatus for carrying out the process for machining a pressure detection hole according to claim 1, the apparatus comprising:

pressure detection member positioning means that is capable of detachably holding the pressure detection member and of moving in the X axis direction;

a drilling device that, relative to the pressure detection member positioning means, cannot move in the Y axis direction but can move in the Z axis direction, and that supports the stylus or the drill;

a microscope that picks up an enlarged image of the pressure detection member and the tip of the stylus or the drill and displays it on a monitor; and storage means that stores positions in the X axis direction of said one side edge of the pressure detection member and the plurality of pressure detection passages read off using the image displayed on the monitor.

* * * * *